United States Patent
Zolla et al.

(10) Patent No.: US 9,553,794 B1
(45) Date of Patent: Jan. 24, 2017

(54) TRAFFIC ENGINEERING FOR NETWORK USAGE OPTIMIZATION

(71) Applicant: Google Inc., Mountain View, CA (US)

(72) Inventors: Jonathan Edward Zolla, Belmont, CA (US); Aspi Homi Siganporia, Saratoga, CA (US); Uday Ramakrishma Naik, Fremont, CA (US); Alok Kumar, Fremont, CA (US); Sushant Jain, Sunnyvale, CA (US); Michael Alex Frumkin, Los Altos, CA (US)

(73) Assignee: Google Inc., Mountain View, CA (US)

(*) Notice: Subject to any disclaimer, the term of this patent is extended or adjusted under 35 U.S.C. 154(b) by 190 days.

(21) Appl. No.: 14/152,548

(22) Filed: Jan. 10, 2014

Related U.S. Application Data

(60) Provisional application No. 61/751,104, filed on Jan. 10, 2013.

(51) Int. Cl.
| | |
|---|---|
| *H04L 12/729* | (2013.01) |
| *H04L 12/803* | (2013.01) |
| *H04L 12/721* | (2013.01) |
| *H04L 12/917* | (2013.01) |
| *H04L 12/801* | (2013.01) |
| *H04L 12/751* | (2013.01) |
| *H04L 12/911* | (2013.01) |

(52) U.S. Cl.
CPC ......... H04L 45/125 (2013.01); H04L 45/123 (2013.01); H04L 47/11 (2013.01); H04L 47/122 (2013.01); H04L 47/76 (2013.01); H04L 45/02 (2013.01); H04L 47/18 (2013.01); H04L 47/829 (2013.01)

(58) Field of Classification Search
CPC ...... H04L 45/02; H04L 45/123; H04L 45/125; H04L 43/08; H04L 41/12; H04L 41/142; H04L 47/11; H04L 47/18; H04L 47/122; H04L 47/125; H04L 47/29; H04L 47/829; H04L 47/80; H04L 47/76; H04L 2012/5623
See application file for complete search history.

(56) References Cited

U.S. PATENT DOCUMENTS

| | | |
|---|---|---|
| 7,206,282 B1 | 4/2007 | Goldman et al. |
| 8,797,867 B1 | 8/2014 | Chen et al. |
| 8,942,225 B2 | 1/2015 | Hiie et al. |
| 8,964,546 B1 * | 2/2015 | Jain ............... H04L 43/0894 370/232 |
| 9,007,898 B2 | 4/2015 | Jain et al. |
| 9,088,510 B2 | 7/2015 | Li et al. |

(Continued)

OTHER PUBLICATIONS

Barakat, et al, "Modeling Internet Backbone Traffic at the Flow Level", IEEE Transactions on Signal Processing, vol. 51, No. 8, Aug. 2003, 14 pages.

(Continued)

*Primary Examiner* — Joshua Kading
(74) *Attorney, Agent, or Firm* — McDermott Will & Emery LLP

(57) ABSTRACT

A traffic engineering process seeks to optimize network utilization and creating paths in the network such that the network is used efficiently. The exemplary embodiments seek to maintain fairness across allocation of flows while honoring constraints on the number of paths used per flow and the granularity of splits allowed. Exemplary embodiments provide a solution in a speedy manner and get close to optimal solutions for allocation of the network traffic.

22 Claims, 9 Drawing Sheets

(56) References Cited

U.S. PATENT DOCUMENTS

| | | | |
|---|---|---|---|
| 2001/0037401 A1* | 11/2001 | Soumiya | H04L 45/00 709/232 |
| 2002/0103631 A1* | 8/2002 | Feldmann | H04L 41/12 703/22 |
| 2002/0141345 A1* | 10/2002 | Szviatovszki | H04L 45/00 370/238 |
| 2003/0072327 A1* | 4/2003 | Fodor et al. | 370/468 |
| 2003/0163593 A1 | 8/2003 | Knightly | |
| 2005/0201285 A1 | 9/2005 | Simonis | |
| 2007/0011741 A1 | 1/2007 | Robert et al. | |
| 2007/0280245 A1 | 12/2007 | Rosberg | |
| 2013/0117466 A1* | 5/2013 | Hassidim | H04L 29/06088 709/235 |
| 2013/0286846 A1* | 10/2013 | Atlas et al. | 370/236 |

OTHER PUBLICATIONS

Hassidim, et al, "Network Utilization: the Flow View", 2013 Proceedings IEEE INFOCOM, Apr. 2013, pp. 1429-1437.
US Office Action on U.S. Appl. No. 14/217,779 DTD Jan. 15, 2016.

* cited by examiner

TRAFFIC ENGINEERING FOR NETWORK USAGE OPTIMIZATION

RELATED APPLICATIONS

The present application claims priority to a United States provisional application, Patent Application No. 61/751,104, filed Jan. 10, 2013, the contents of which are incorporated herein by reference.

BACKGROUND OF INVENTION

Traffic engineering seeks to optimize network utilization and to deploy paths through a network so as to use the network efficiently. One of the challenges of traffic engineering is to ensure that various flows are treated fairly. Each flow represents an identifiable passage of information from a source to a destination. Unfortunately, many conventional approaches to traffic engineering do not treat all of the flows fairly. Certain flows may be allocated an undue portion of the network resources. Moreover, priorities for flows may not be properly honored.

SUMMARY

In accordance with one aspect of exemplary embodiments of the present invention, a method for determining a group of paths in a network to be used by a flow of data as the data passes from a source switching node to a destination switching node in the network is provided. Initially, a fraction of the flow for each link in the network that is part of the paths of a first group of paths is determined. Then, a link utility function is calculated for each link in the network that is part of the paths of the first group of paths. A link bottleneck utility is determined for each link that is part of the paths of the first group of paths, wherein for each given link, the link bottleneck utility is a utility value at which the given link reaches an allocable capacity of the given link. The link with a minimum link bottleneck utility among the links of the paths of the first group of paths is identified and is designated as a bottleneck link. Paths that include the bottleneck link are removed from the first group of paths to create an updated first group of paths. The fractions of flow for each link in the network that is part of the paths of the updated first group of paths are updated based of the removing of the paths. The updated first group of paths is designated for use by the flow with the updated fractions of the flow for each link that is part of the paths in the updated first group of paths.

In accordance with another aspect of exemplary embodiments of the present invention, a method of quantizing fractions of a flow for paths in a computer network is provided. This method is practiced by a computing device. In this method, fractions of the flow handled by paths are quantized down to a desired quantization level. A link utility function is calculated for links in the network that are to be used by the flow. While the sum of the quantized down fractions of the flow for the paths that are to be used by the flow is less than one, a number of the operations are repeated. In particular, for each path, a quantum is added to the fraction of the flow for the path and an updated link utility function is calculated for the links of the path. The link bottleneck utility is found as the utility at which the capacity of the link is reached. The minimum bottleneck utility for links in the path is determined and designated as the path bottleneck utility. After these operations are completed for each path, a path is picked as the path that is least affected by adding the quantum, and the quantum is added to the selected path. The path that is least affected by adding the quantum is the path with a maximum path bottleneck utility after adding the quantum. The link utility functions are updated to reflect the addition of the quantum.

These methods may be performed by an electronic device. The electronic device may be, for example, a computing device or a switching device. The electronic device may include processing logic.

DETAILED DESCRIPTION

Exemplary embodiments provided herein provide traffic engineering solutions for optimizing network utilization and creating paths in the network such that the network is used efficiently. The exemplary embodiments seek to maintain fairness across allocation of flows while honoring constraints on the number of paths used per flow and the granularity of splits allowed. Exemplary embodiments provide a solution in a speedy manner and get close to optimal solutions for allocation of the network traffic.

Figure 1A:
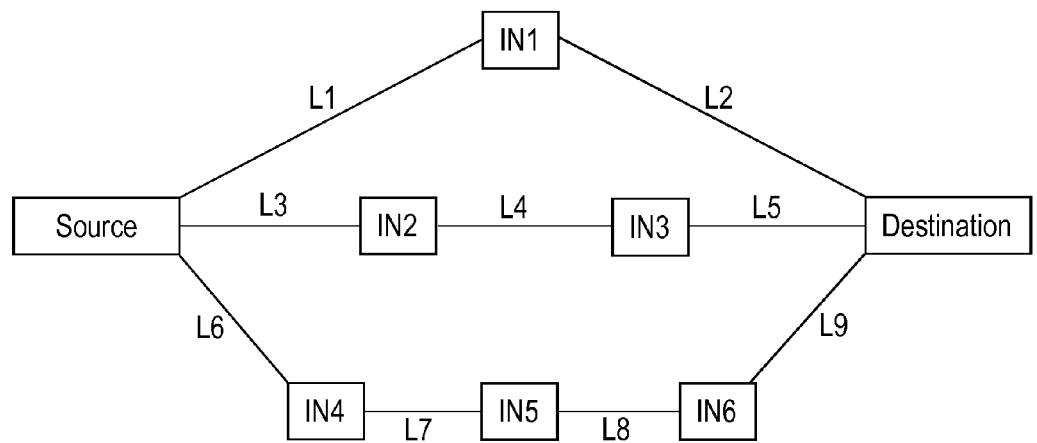
FIG. 1A shows an example of a portion of a network having a source, destination and intermediate nodes interconnected by links.

Before describing the exemplary embodiments in detail it is helpful to introduce a few concepts that are used in exemplary embodiments. FIG. 1A shows a portion of a network environment in which the traffic engineering approach of the exemplary embodiments may be deployed. In particular, the portion of the network includes a source node and a destination node as well as various intermediate nodes designated as IN1-IN6. The nodes are inter-connected via links designated as L1-L9. In the exemplary embodiments described herein, a "topology" of a network or portion of a network is a simple directed graph with nodes and links.

Each node may be a switch, router, or other forwarding or switching device capable of forwarding information from a predecessor to a successor. A "link" is a communication resource that allows transmission of information from one node to another.

A "path" from a source node to a destination node is a vector of links where the source of the first link is the source of the path and that the destination of the last link is the destination of the path. Thus, a path P1 (see FIG. 1A) may be represented by the vector, {L1, L2}. Similarly, a path P2 may be represented by the vector, {L3, L4, L5}, and the path P3 may be represented by the vector, {L6, L7, L8, L9}.

A "PathGroup" is a vector of paths where all of the paths share the same source and destination. Thus, for the above example depicted in FIG. 1A, a PathGroup might be {P1, P2, P3}. Paths and PathGroups are each assigned a weight that indicates the ratio of the traffic that should be routed to each path within the total traffic of a flow.

Figure 1B:
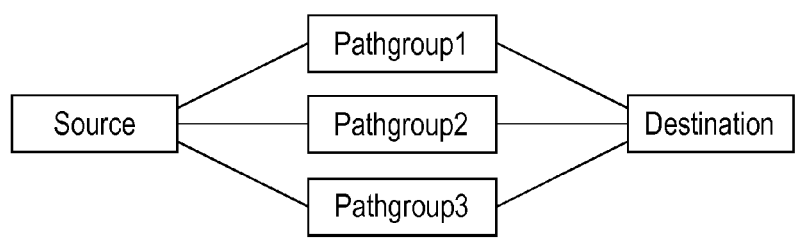
FIG. 1B shows an example of multiple PathGroups interconnecting a source to a destination.

A "PathGroupPreference" is a vector of PathGroups and expresses the desire of a flow of how the would like to pass through the network. The flow would like to take paths on the first PathGroup, and if all of the paths are full, the flow would like to take the second PathGroup, etc. FIG. 1B shows an example wherein the source node and the destination note are inter-connected by multiple PathGroups. The PathGroups are designated PathGroup1, PathGroup2 and PathGroup3. The PathGroupPreference might be a vector such as {PathGroup1, PathGroup2, PathGroup3} indicating that PathGroup1 is the preferred PathGroup followed by PathGroup2 and then PathGroup3.

Figure 2:
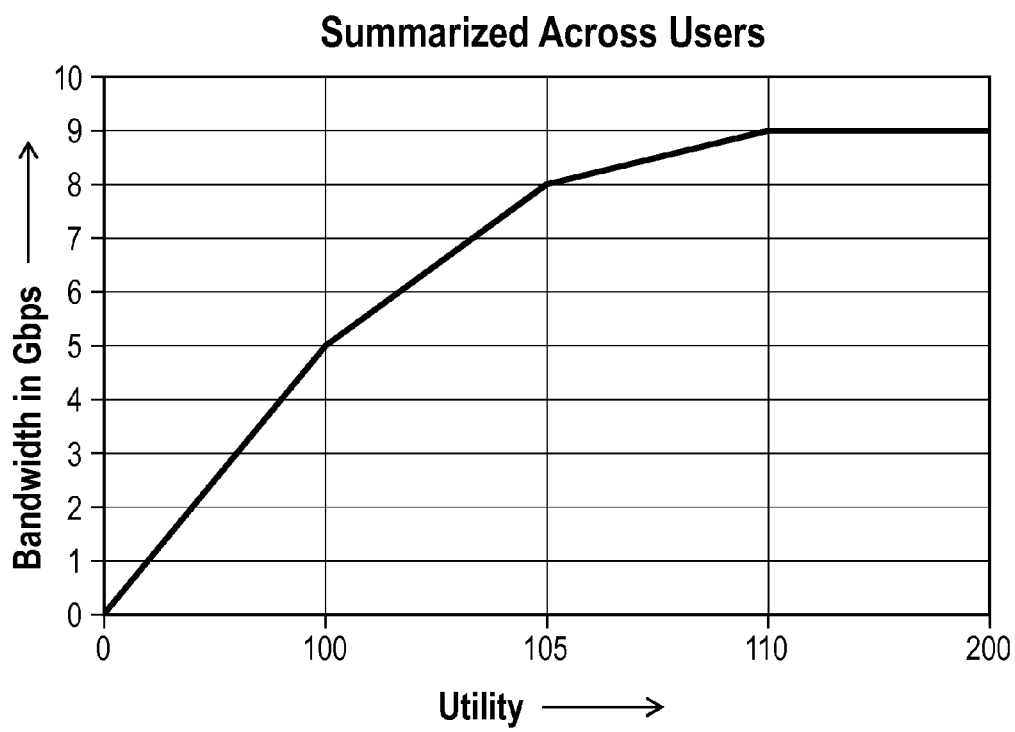
FIG. 2 is a graphical representation of a utility function that determines utility relative to bandwidth.

Each flow has an associated utility function which describes the priority of the flow and the demand of the flow. An example of a utility function as depicted in FIG. 2. The goal of fairness as practiced by the exemplary embodiments described herein is to allocate max-min fair utility to all flows. For each utility value, there is a corresponding bandwidth as is shown in FIG. 2. The slope of the function of each point defines the priority or weight of the flow, and the slope may change when the flow is allocated more bandwidth or utility. The slope of the function typically decreases with utility increasing. In the embodiment described herein, the function flattens after a certain bandwidth and the point in which the flattening occurs is known as the "demand" of the flow. In example depicted in FIG. 2, the demand of the flow is 9 gigabits per second. The approach described herein may also handle cases where the curve does not flatten and thus, is effectively infinite. In such an instance, space is allocated until no more paths are available.

Figure 3:
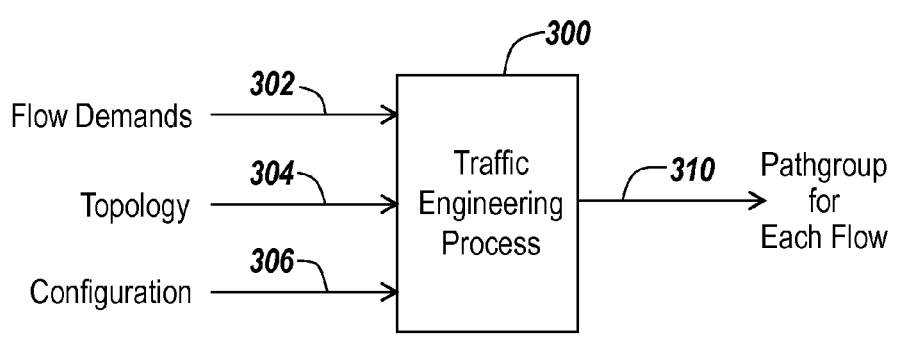
FIG. 3 is a block diagram illustrates the inputs and outputs for the traffic engineering process described herein.

FIG. 3 provides a block diagram view of the traffic engineering process of the exemplary embodiments described herein that shows the inputs and resulting outputs. The inputs include a set of flows with prioritized demand 302. The flow demands may be updated at regular intervals, such as every 10 seconds. A topology 304 for the network or a portion of the network is input to the traffic engineering process. As mentioned above, this topology may be represented as a directed graph with nodes and links representing the portion of the network or the network to which the traffic engineering is to be applied. Each link has an associated capacity that can be used to allocate demands of flow. Updates for changes in the topology are noted and reflected in this topology input 304. Configuration input 306 provides configuration information that is used by the traffic engineering process. Configuration information may include, for example the cost of each link in the network or portion of the network. The cost may capture various qualities, such as latency but is generally an abstract quantity.

The output from the traffic engineering process 300 is a PathGroup for each flow 310 with weights for each path in the PathGroup. The PathGroup represents the paths that the flow should traverse to use the network efficiently and in what ratios these paths should be used. This PathGroup is calculated to keep in mind all the flows in the system, the demands of the flows and priorities of the flows as well as the available links and the capacity of those links. Details of the traffic engineering process of the exemplary embodiments are provided below.

Figure 4:
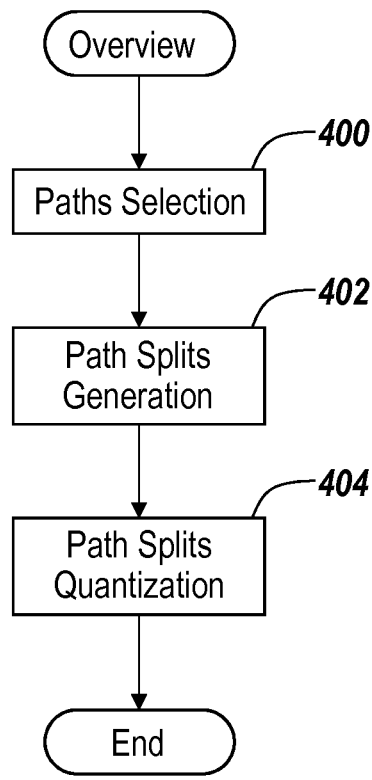
FIG. 4 is a flowchart that provides an overview of the steps performed in the traffic engineering process of exemplary embodiments described herein.

FIG. 4 provides a flowchart illustrating an overview of the steps performed in the traffic engineering process of the exemplary embodiments described herein. Initially, Path Selection 400 occurs. Path Selection 400 looks at flows and topology and creates a PathGroup preference for each flow. Next, Path Splits Generation 402 is performed. The Path Splits Generation 402 generates a PathGroup for each flow to use the network efficiently. The Path Splits Generation takes into account the flows, prioritized demands and the PathGroupPreferences that come out of the Path Selection 400. Lastly, Path Splits Quantization 404 is performed to quantize Path Splits for flows to match expectations of hardware while minimizing loss of efficiency due to the Path Splits Generation 402.

Figure 5A:
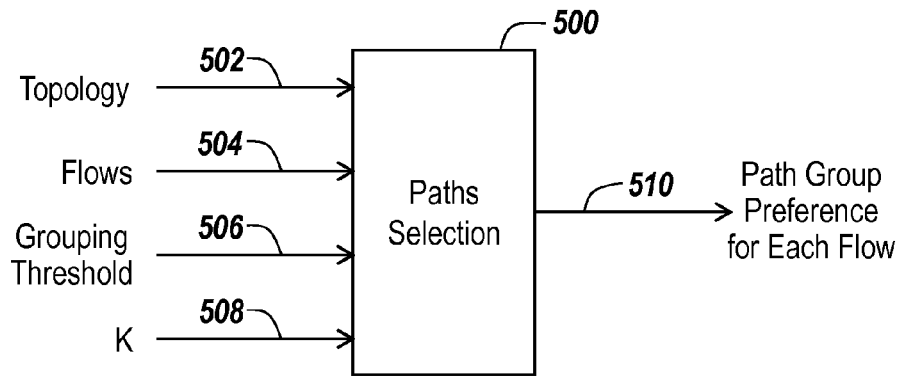
FIG. 5A depicts the inputs and the outputs of the path selection.

Given the above overview, it is helpful to review the inputs and outputs of each of these three stages of the traffic engineering process described herein. FIG. 5A shows the inputs and outputs of the Paths Selection 500. The Paths Selection 500 receives a topology 502, flows 504, a grouping threshold 506 from the configuration information and a maximum number of paths 508 that may be employed in a PathGroup. All paths with cost within the grouping threshold 506 are grouped together in a PathGroup in the PathGroupPreference. The output from Paths Selection 500 is a PathGroupPreference for each flow. As was discussed above the PathGroupPreference list the Preferred PathGroups in a predetermined order for each flow.

Figure 5B:
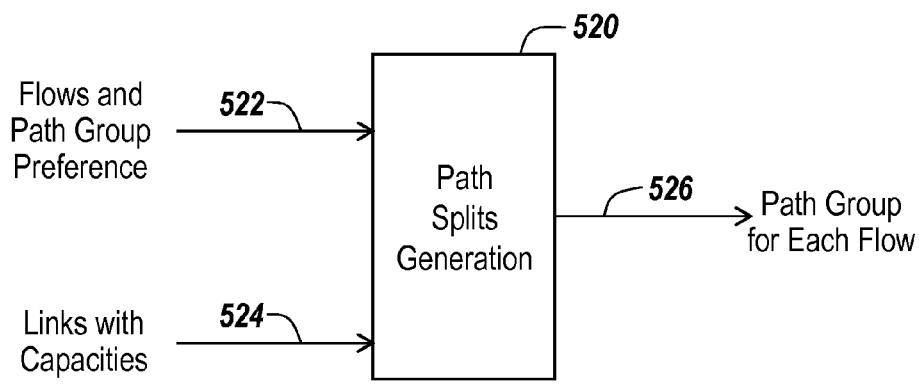
FIG. 5B depicts the inputs and the outputs of the path splits generation.

FIG. 5B shows the inputs and outputs for the Path Splits Generation 520. The Path Splits Generation receives the flows, PathGroupPreference 522 (resulting from Paths Selection 500) and the links with the capacity of the links 524 as inputs. The output is a PathGroup for each flow 526.

Figure 5C:
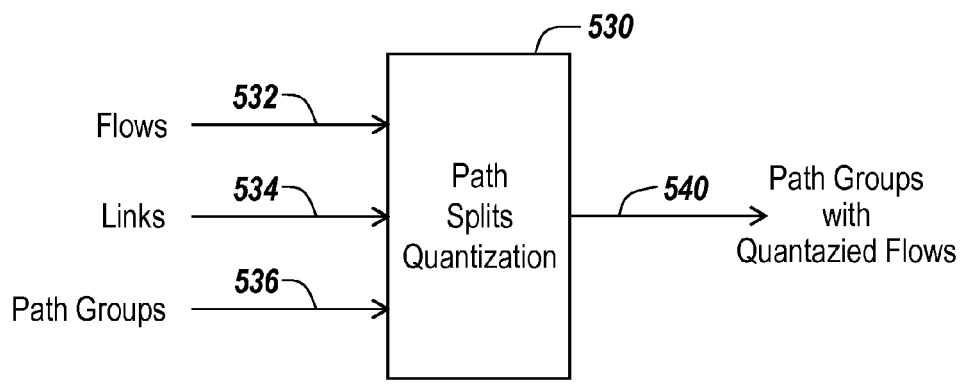
FIG. 5C depicts the inputs and outputs of the path splits quantization.
Figure 6:
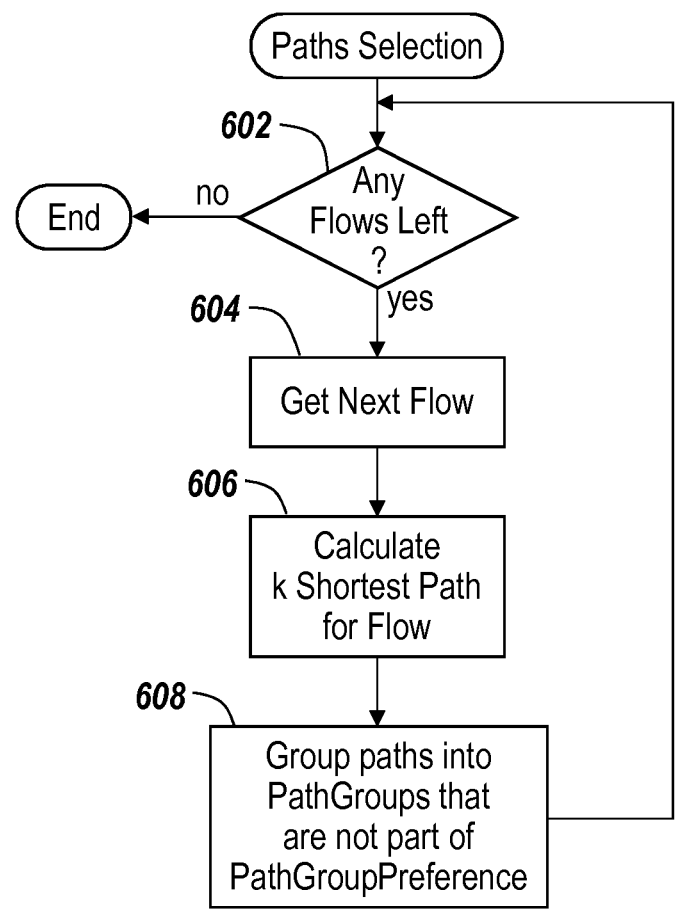
FIG. 6 of the flowchart illustrating steps performed during path selection.

FIG. 5C shows the inputs and outputs for Path Splits Quantization 530. Path Splits Quantization 530 receives the flows 532, the links 534 and the PathGroups 536 (as output from the Path Splits Generation 520) as inputs. The Path Splits Quantization 530 outputs PathGroups with quantized weights 540. These PathGroups and weights are then used by the flows in the network FIG. 6 shows a flowchart that illustrates in more detail the steps performed during Paths Selection. As can be seen in FIG. 6, Path Selection seeks to calculate the PathGroupPreference that is used in Path Splits Generation. The traffic engineering process assumes that the path with the lowest cost is the most preferred path followed by the next lowest costs and so forth. The first PathGroup in the PathGroupPreference contains the lowest cost path followed by the second PathGroup containing the second lowest cost path, etc. The algorithm generally finds the k shortest path in the topology where k=the maximum number of paths as specified by the configuration. This is done for each flow. Each path in the k shortest path is different from another by at least one link and contains no loop. Various approaches may be used to find the k shortest path but a suitable solution is the Eppstein Algorithm or a modified version thereof.

As shown in FIG. 6, the process begins by seeing if there are any flows left to be processed (Step 602). If there is not, the Paths Selection is complete. If there are still flows left to be processed, the next flow is obtained (Step 604). The k shortest path is then calculated for the flow (Step 606). Paths are grouped into PathGroups (Step 608). Paths with costs within the grouping threshold are grouped into a PathGroup. As was mentioned above, the Eppstein Algorithm or a modified version may be applied to calculate the k shortest path.

The Path Splits Generation seeks to optimize network utilization and find a PathGroup for each flow such that bandwidth is available for higher priority flows. The goal of this portion of the process is to achieve max-min fairness in utility across all flows. Although the approach described herein does not provide a theoretical optimal solution, the approach provides a solution that is much more computationally fast than the optimal solution (as could be found with linear programming) and provides a close to optimal solution.

Figure 7:
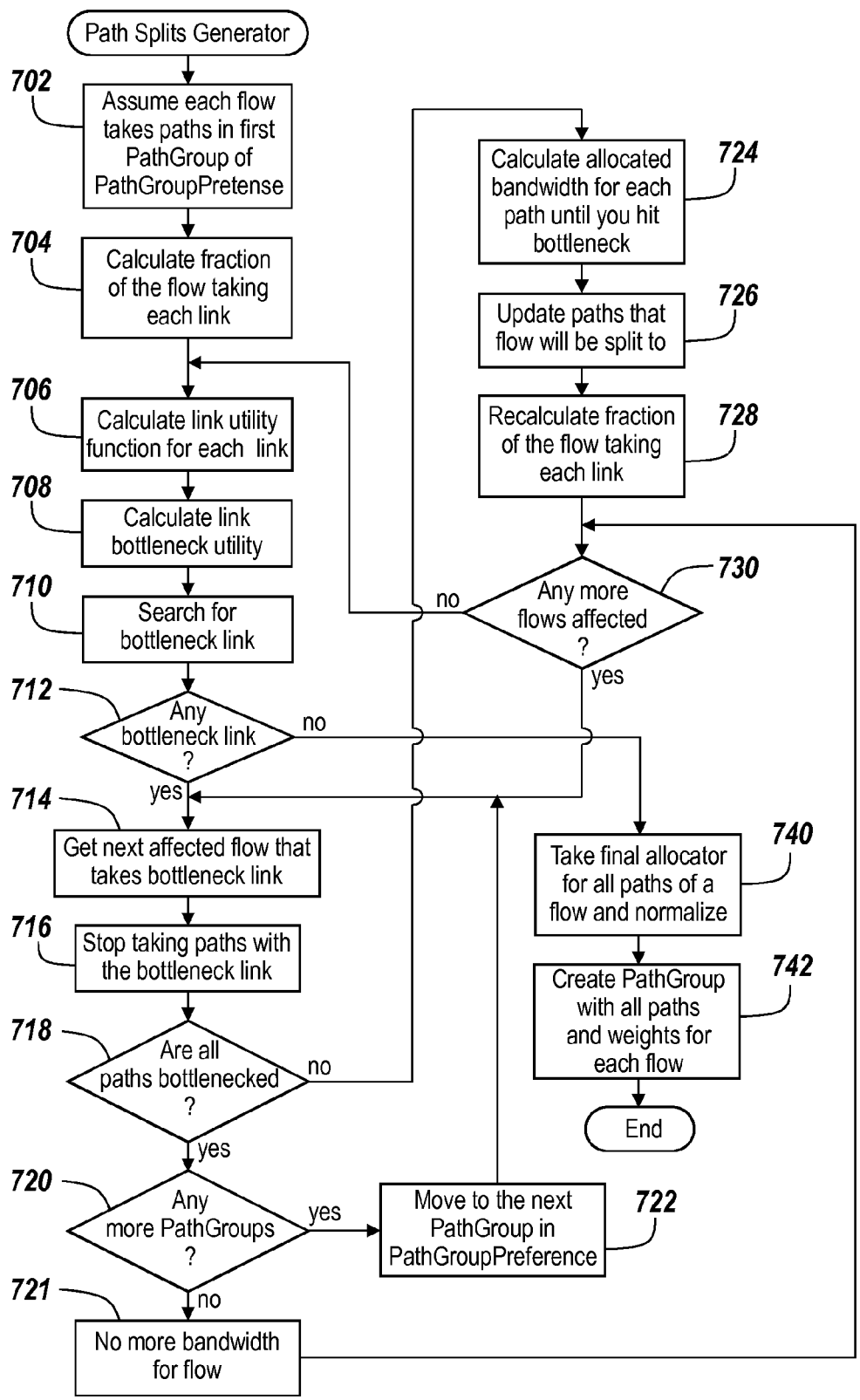
FIG. 7 is a flowchart listing steps performed during path splits generation.

FIG. 7 depicts the steps performed during Path Splits Generation in more detail. Initially, for each flow, it is assumed that the first path in the PathGroupPreference generated during Paths Selection for the flow is the path that is taken by the flow (Step 702). The fraction of the flow taking each link is calculated (Step 704). For example, if a flow has two paths in its PathGroup, designated as P1 and P2 with a ratio 0.5 to 0.5 where P1={L1, L2} and P2={L1, L3}, then link L1 gets 1.0 of the flow while links L2 and L3 get 0.5 of the flow.

A link utility function is then calculated for each link in the topology (Step 706). The link utility function for a link is the sum of each flow's utility functions taking the link times the fraction of flow taking the link. In this context, the sum of the utility functions means the sum of bandwidth for all values of utility. Multiplying the sum of each utility function taking the link times the fraction of flow taking the link means that the bandwidth is multiplied by the fraction for all values of the utility. For each link, given the link utility function and link's allocable capacity, the utility at which the link reaches its allocable capacity is calculated. This is known as the link bottleneck utility. Hence, in Step 708, the link bottleneck utility is calculated for each link. Then the link with the minimum bottleneck utility is located and designated as the bottleneck link (See Step 710 and Step 712).

Each flow affected by taking the bottleneck link is processed. Thus, the next affected flow that takes the bottleneck link is obtained (Step 714) and the paths with the bottleneck link are no longer taken (Steps 716). If all the paths are bottlenecked (Step 718), i.e., all the paths include the bottleneck link, the process sees it there are anymore Path-Groups (See Step 720). If not, no more bandwidth is allocated for the flow (Step 721). The process then looks to see if there are more flows (Step 730). Otherwise, the process moves to the next PathGroup in the Path Preference Group for the flow (See Step 722). If all the paths are not bottlenecked, then the traffic engineering process calculates the allocated bandwidth to each path till the bottleneck (Step 724). Beyond the allocated portion, the paths are updated to reflect how the flow will be split (Step 726). For example if a PathGroup was {P1, P2, P3} with each path allocated 0.33 of the flow, and P2 becomes the bottleneck. The PathGroup is updated to eliminate Path P2 that includes the bottleneck link so that the new PathGroup becomes {P1, P3} with each having a 0.5 of the flow. Thus, the fraction of the flow taking each link is recalculated as discussed in this example (Step 728). If there are more flows affected by the bottleneck link (See Step 730), then the next flow is processed again beginning as Step 714. However if all of the flows that are affected in the process, the process begins again at Step 706 to search for the next bottleneck link, to add allocation to paths and adjust the fractions of flows on links.

When all of the bottleneck links have been located (See Step 712), the process is stopped because no other link could be in the bottleneck. A link is not a bottleneck when the link utility function flattens before the allocable capacity of the link. At this point, the final allocation is taken for all paths of the flow. The allocation is normalized by dividing the allocation of the path by the total allocation of the flow (Step 740). This results in the weight of the path. Lastly, a PathGroup is created with all paths and weights for each flow, and the PathGroup is output (Step 742).

One of the complications of the path splits generation is that the PathGroup per flow can have arbitrary splits and may not be configurable in hardware. As a result there is a need to quantize to match the hardware limitations. For example, in certain hardware, path splits can be only in multiples of 0.25. Thus, is in the Path Splits Quantization process, the ideal path splits are modified to approximately multiples of 0.25 in such a case.

Figure 8:
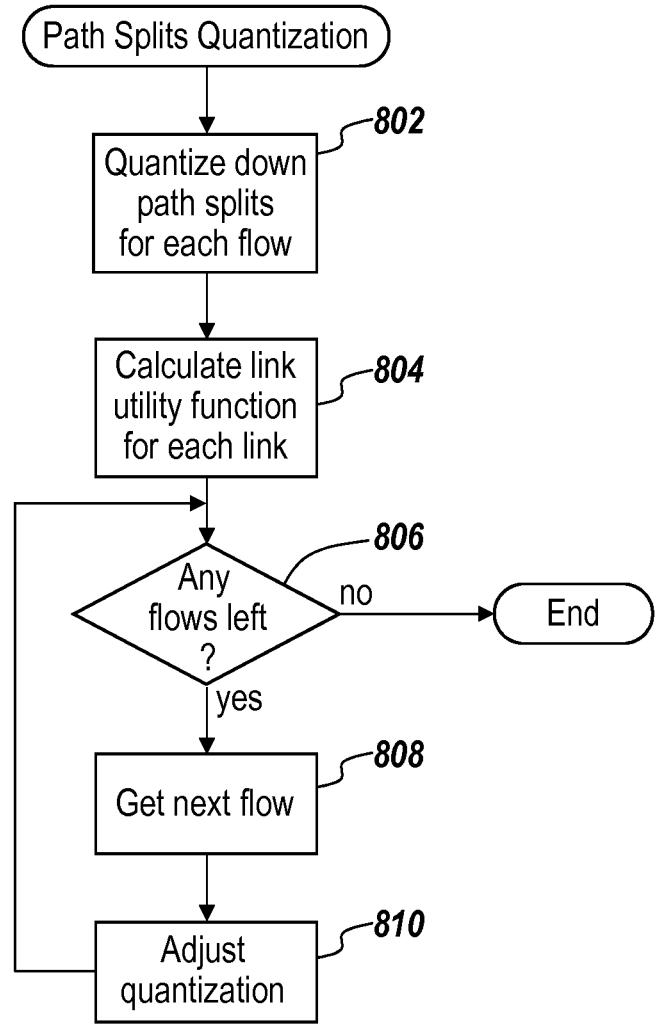
FIG. 8 is a flowchart illustrating the steps performed during path splits quantization.

FIG. 8 shows a flowchart of the steps taken during Path Splits Quantization. First, the path splits for each flow are quantized down (Step 802). For example, with a quantization desired to be in multiples of 0.25, the flow with splits of 0.4:0.4:0.2 is quantized down to 0.25; 0.25; 0. The link utility function is calculated for all links given each flows utility function and quantized down paths splits (Step 804). The process then checks if there are any flows left to be processed (See Step 806) and gets the next flow (Step 808). For this flow, the quantization is adjusted (Step 810). This process is repeated until there are no flows left to process. (See "No" output of Step 806). Those skilled in the art will appreciate that other quantization processes may be used and that the quantization described herein is intended to be merely illustrative and not limiting.

Figure 9:
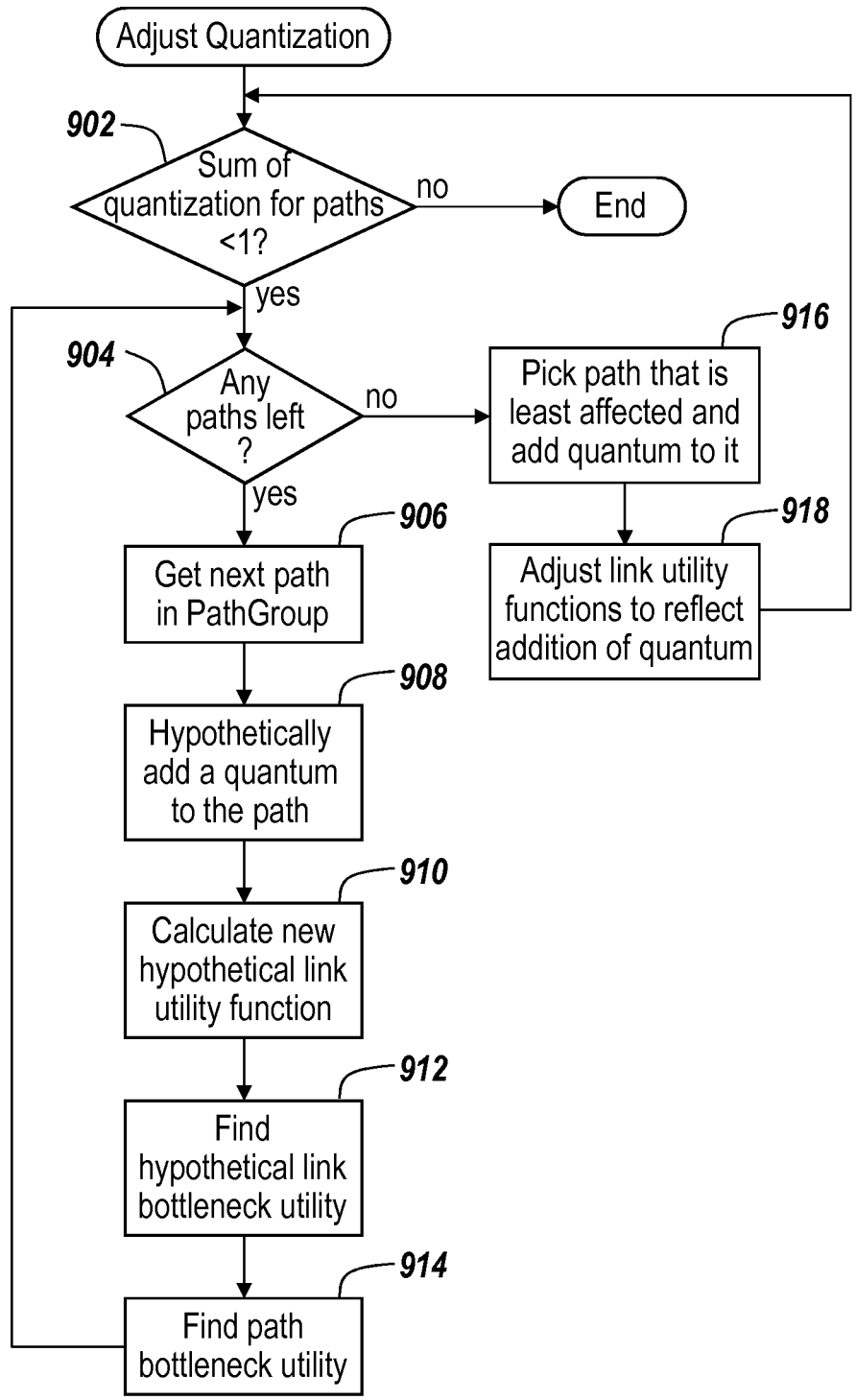
FIG. 9 is a flowchart illustrating the steps that are performed to adjust quantization during the path splits quantization.

FIG. 9 shows the adjust quantization process (of Step 810) in more detail. This process is repeated while the sum of the quantized path splits for a flow is less than 1 (See Step 902). In particular, the process checks whether there are any paths left to be processed in Step 904). If there are steps to be processed, the next path in the PathGroup for the flow is obtained (Step 906). Hypothetically, a quantum is added to the path (Step 908). By hypothetically, it is meant that as part of this process, it is assume that a quantum is added in the path but that the addition is not final. Suppose for example that 0.25 is added as a quantum for the quantization of the path splits. The new hypothetical link utility function is then calculated (Step 910). Based upon this hypothetical link utility function and link allocatable capacity, the hypothetical link bottleneck utility is calculated for all the links (Step 912). The minimum of the bottleneck utility for all the links in the path is called the path bottleneck utility (Step 914). This process is repeated for each path until there are no paths left to process. Once there are no paths left to process (See "No" output of Step 904), the path is selected is least affected by adding a quantum and the quantum is added to that path (Step 916). In particular, the path with the maximum path bottleneck utility after addition of the quantum is the one that is least affected. The actual link utility functions are adjusted to reflect this addition of quantum (Step 918). In this fashion, the quanta for the paths are adjusted accordingly to complete the path of splits quantization process.

Figure 10:
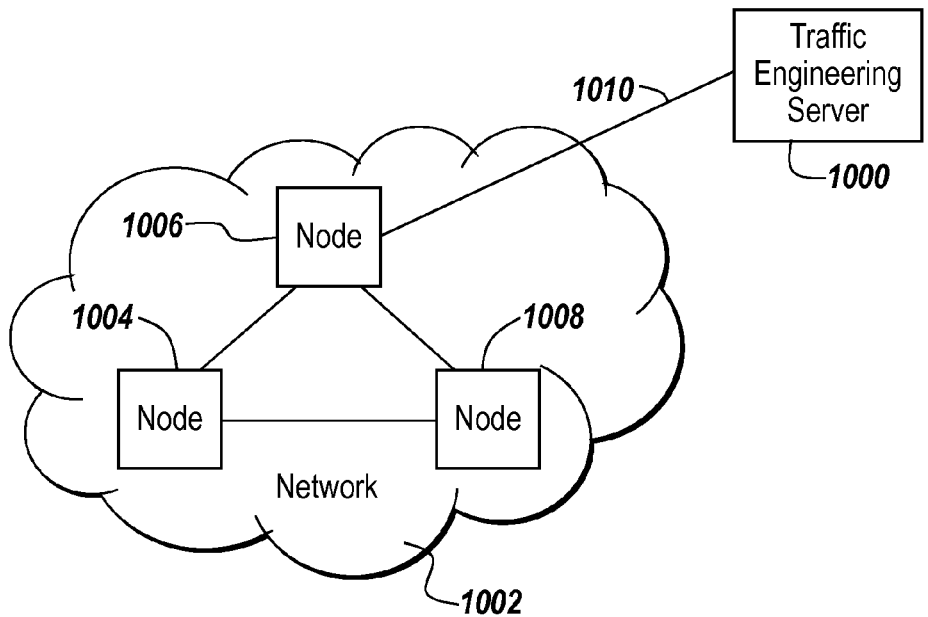
FIG. 10 illustrates an exemplary arrangement in which a traffic engineering server controls flows of nodes within the network.

The traffic engineering process described herein may be performed by a Traffic Engineering (TE) Server 1000, such as depicted in the block diagram of FIG. 10. The TE Server 1000 may be, for example, an OpenFlow controller or other Software Defined Network (SDN) controller. In the depiction in FIG. 10, the TE Server 1000 is in communication with a node 1006 over a secure channel 1010. The network 1002 also includes nodes 1004 and 1008. The TE Server 1000 may configure the flows of the nodes to perform the traffic engineering processing described above.

Figure 11:
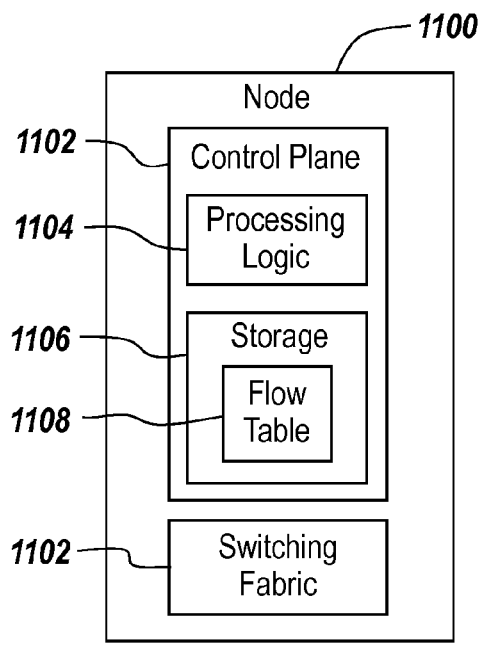
FIG. 11 is a block diagram illustrating components found in a node in exemplary embodiments described herein.

FIG. 11 shows an example of one of the nodes 1100 that may be found, for example, in the network 1002 (FIG. 10) under the control of the TE Server 1000. The node 1100 shown in FIG. 11 includes a control plane 1100 that provides control and management functionality for the node. The node 1100 may be, for example, a switch, a router, a forwarding device, a blade server, and the like. The control plane 1100 may include processing logic 1104. The processing logic 1104 may take many forms, including that of a microprocessor, a controller, an application specific integrated circuit (ASIC) or may even be implemented in software that runs on a microprocessor, an ASIC or a controller to realize the functionality of the node 1100. The node may include the storage 1106, the storage may include both volatile/non-volatile memory. The storage may hold computer readable media and may hold various programs and data as needed. The storage may hold a flow table 1108 that dictates how flows are forwarded by the node. The node may include switching fabric 1102 for directing inputs to appropriate outputs for the node.

While the present invention is described with reference exemplary embodiments thereof, those skilled in the art will appreciate various changes in form and detail may be made without departing from the intended spirit and scope of the invention as defined in the appended claims.

The invention claimed is:

1. A method for determining a group of paths in a network to carry an existing flow of data as the data passes from a source switching node to a destination switching node in the network, comprising:
   determining fractions of the existing flow traversing each link of a plurality of links in the network included in paths of a first group of paths, the first group of paths including a plurality of paths between the source switching node and the destination switching node;
   calculating a link utility function for each link included in the paths of the first group of paths;
   determining a link bottleneck utility value for each link included in the paths of the first group of paths, wherein for each given link, the link bottleneck utility value is a link utility value at which the given link would reach an allocable capacity of the given link;
   identifying, as a first bottleneck link, one of the links of the paths of the first group of paths with a lowest link bottleneck utility value among the links of the paths of the first group of paths;
   removing, from the first group of paths, paths that include the first bottleneck link to create an updated first group of paths;
   identifying updated fractions of the existing flow traversing each link included in the paths in the updated first group of paths based on the removal of the bottleneck link; and
   designating the updated first group of paths for use by the existing flow with the updated fractions of the existing flow for each link included in the updated first group of paths.

2. The method of claim 1, further comprising normalizing the updated fractions of the existing flow for the links in the paths in the updated first group of paths.

3. The method of claim 2, wherein the normalizing comprises:
   dividing a fraction of the existing flow on each path by a total for the existing flow.

4. The method of claim 1 wherein the method is performed by a controller in a software defined network.

5. The method of claim 1, further comprising:
   identifying, as an additional bottleneck link, one of the links of the paths of the updated first group of paths with a second lowest bottleneck utility value among the links of the paths of the updated first group of paths.

6. The method of claim 5, further comprising:
   removing paths that include the additional bottleneck link from the updated first group of paths to create a further updated first group of paths.

7. The method of claim 6, further comprising:
   further updating, for each link in the further updated first group of paths, the respective fractions of the existing flow traversing the further updated first group of paths via the respective link.

8. The method of claim 7, further comprising:
   normalizing the further updated fractions of the existing flow for the links in the paths of the further updated first group of paths.

9. The method of claim 1, wherein the existing flow of data is a first flow, the method further comprising identifying a second existing flow of data traversing the first bottleneck link and causing the second existing flow to stop traversing the first bottleneck link, wherein the second existing flow is different from the first flow.

10. An electronic device, comprising:
    processing logic for:
       determining current fractions of an existing flow traversing each link of a plurality of links in a network included in paths of a first group of paths, the first group of paths including a plurality of paths;
       calculating a link utility function for each link included in the paths of the first group of paths;
       determining a link bottleneck utility value for each link included in the paths of the first group of paths, wherein for each given link, the link bottleneck utility value is a link utility value at which the given link would reach an allocable capacity of the given link;
       identifying, as a first bottleneck link, one of the links of the paths of the first group of paths with a lowest link bottleneck utility value among the links of the paths of the first group of paths;
       removing, from the first group of paths, paths that include the first bottleneck link to create an updated first group of paths;
       identifying updated fractions of the existing flow traversing each link included in the paths in the updated first group of paths based on the removal of the bottleneck link; and
       designating the updated first group of paths for use by the existing flow with the updated fractions of the existing flow for each link included in the updated first group of paths.

11. The electronic device of claim 10, wherein the electronic device is a computing device.

12. The electronic device of claim 10, wherein the electronic device is a switch.

13. The electronic device of claim 10, wherein the processing logic is a microprocessor.

14. The electronic device of claim 10, wherein the processing logic is an application specific integrated circuit (ASIC).

15. The electronic device of claim 10, the processing logic further configured to normalize the updated fractions of the existing flow for the links in the paths in the updated first group of paths.

16. The electronic device of claim 15, wherein the normalizing comprises:

dividing a fraction of the existing flow on each path by a total for the existing flow.

17. The electronic device of claim 10, wherein the electronic device is a controller in a software defined network.

18. The electronic device of claim 10, the processing logic further configured to identify, as an additional bottleneck link, one of the links of the paths of the updated first group of paths with a second lowest bottleneck utility value among the links of the paths of the updated first group of paths.

19. The electronic device of claim 18, the processing logic further configured to remove paths that include the additional bottleneck link from the updated first group of paths to create a further updated first group of paths.

20. The electronic device of claim 19, the processing logic further configured to further update, for each link in the further updated first group of paths, the respective fractions of the existing flow traversing the further updated first group of paths via the respective link.

21. The electronic device of claim 20, the processing logic further configured to normalize the further updated fractions of the existing flow for the links in the paths of the further updated first group of paths.

22. The electronic device of claim of claim 10, wherein the existing flow of data is a first flow, the processing logic further configured to identify a second existing flow of data traversing the first bottleneck link and to cause the second existing flow to stop traversing the first bottleneck link, wherein the second existing flow is different from the first flow.

* * * * *